United States Patent [19]

Schneider

[11] Patent Number: 5,686,004

[45] Date of Patent: Nov. 11, 1997

[54] PIZZA OVEN WITH CONVEYOR

[76] Inventor: Russell C. Schneider, 288 W. 100 North, Lehi, Utah 84043

[21] Appl. No.: 646,706

[22] Filed: Apr. 29, 1996

[51] Int. Cl.⁶ .................. F27B 9/14; F27B 9/30; A62B 1/48; A62B 1/50
[52] U.S. Cl. .................. 219/388; 219/400; 99/386; 99/443 C
[58] Field of Search .................. 219/388, 400; 99/386, 443 C; 126/214; 34/216, 217; 432/121, 128

[56] References Cited

U.S. PATENT DOCUMENTS

| | | | |
|---|---|---|---|
| 1,621,234 | 3/1927 | Carpenter . | |
| 1,774,433 | 8/1930 | Gardiner . | |
| 1,820,745 | 8/1931 | Kater . | |
| 1,974,204 | 9/1934 | Cooter . | |
| 2,139,334 | 12/1938 | Rebois . | |
| 2,151,401 | 3/1939 | Belcher | 219/19 |
| 2,195,637 | 4/1940 | Anderson | 219/19 |
| 2,264,611 | 12/1941 | Bemis | 219/19 |
| 2,265,421 | 12/1941 | Donnelly | 126/41 |
| 2,349,583 | 5/1944 | Tatosian | 99/373 |
| 2,549,375 | 4/1951 | Goddard | 99/386 |
| 2,620,723 | 12/1952 | Morley . | |
| 2,689,517 | 9/1954 | Angelus | 99/345 |
| 2,738,723 | 3/1956 | Jennett | 99/329 |
| 3,012,496 | 12/1961 | Kelley et al. . | |
| 3,401,626 | 9/1968 | Amalfitano . | |
| 3,485,231 | 12/1969 | Guibert . | |
| 3,494,305 | 2/1970 | Pachyn | 107/57 |
| 3,659,517 | 5/1972 | Holen | 99/355 |
| 3,681,096 | 8/1972 | Philipe | 99/339 |
| 3,693,536 | 9/1972 | Carville et al. | 99/386 |
| 3,753,737 | 8/1973 | Latham et al. | 99/113 |
| 4,007,368 | 2/1977 | Jensen et al. | 219/388 |
| 4,023,007 | 5/1977 | Brown | 219/388 |
| 4,079,666 | 3/1978 | Plemons et al. | 99/355 |
| 4,164,591 | 8/1979 | Ahlgren et al. | 426/523 |
| 4,185,546 | 1/1980 | Karpisek | 99/386 |
| 4,188,868 | 2/1980 | Baker et al. | 99/386 |
| 4,208,441 | 6/1980 | Westover | 426/293 |
| 4,276,465 | 6/1981 | Flavio | 219/388 |
| 4,289,064 | 9/1981 | Rosenblatt | 99/334 |
| 4,338,911 | 7/1982 | Smith | 126/21 A |
| 4,377,109 | 3/1983 | Brown et al. | 99/401 |
| 4,383,823 | 5/1983 | Williams et al. | 432/148 |

(List continued on next page.)

Primary Examiner—Teresa J. Walberg
Assistant Examiner—J. Pelham
Attorney, Agent, or Firm—Foster & Foster

[57] ABSTRACT

Disclosed is an apparatus for cooking foodstuffs by conveying the foodstuffs through a cooking chamber comprising:

an oven section and at least one integral conveyor section, the oven section comprising a bottom wall, top wall, two side walls, a front wall, and a rear wall defining a cooking chamber, the front wall having a front aperture and the rear wall having a rear aperture horizontally aligned with the front aperture, an electrical heating means comprising radiant heaters disposed within the cooking chamber to heat a foodstuff in the cooking chamber;

a conveyor section removably attached to the oven section and comprising a continuous heat-resistant flexible belt formed into an elongated continuous loop with an essentially horizontal upper flight, a front reverse curve at a front end, a lower flight and a rear reverse curve at a rear end, drive means for advancing the belt around the continuous loop to convey foodstuffs along the top flight, the drive means attached to the conveyor section in a manner and the conveyor section dimensioned such that the elongated continuous loop can be inserted lengthwise into the oven section through the aligned front and rear apertures of the oven section, the front and rear apertures dimensioned to receive the elongated continuous loop, the conveyor section removably attached to the oven section with the top and bottom flights extending through the cooking chamber and the front and rear ends extending in cantilever fashion out from the front and rear walls, respectively.

28 Claims, 8 Drawing Sheets

U.S. PATENT DOCUMENTS

| | | | |
|---|---|---|---|
| 4,386,558 | 6/1983 | Holman et al. | 99/386 |
| 4,389,562 | 6/1983 | Chaudoir | 219/388 |
| 4,404,898 | 9/1983 | Chaudoir | 99/331 |
| 4,462,307 | 7/1984 | Wells | 99/386 |
| 4,462,383 | 7/1984 | Henhe et al. | 99/443 C |
| 4,506,652 | 3/1985 | Baker et al. | 126/21 A |
| 4,530,276 | 7/1985 | Miller | 99/386 |
| 4,554,437 | 11/1985 | Wagner et al. | 219/388 |
| 4,591,333 | 5/1986 | Henke | 432/10 |
| 4,615,014 | 9/1986 | Gigandet et al. | 99/386 |
| 4,627,335 | 12/1986 | Sherman et al. | 99/325 |
| 4,734,553 | 3/1988 | Noda | 219/10.55 B |
| 4,739,154 | 4/1988 | Bharara et al. | 219/388 |
| 4,751,877 | 6/1988 | Andersson | 99/443 |
| 4,839,503 | 6/1989 | Wolf et al. | 219/497 |
| 4,924,763 | 5/1990 | Bingham | 99/339 |
| 4,936,286 | 6/1990 | Baker | 126/41 R |
| 4,949,629 | 8/1990 | Leary et al. | 99/386 |
| 4,951,648 | 8/1990 | Shukla et al. | 126/21 A |
| 4,964,392 | 10/1990 | Bruno et al. | 126/21 A |
| 4,986,174 | 1/1991 | Gongwer | 99/345 |
| 5,025,775 | 6/1991 | Crisp | 126/21 A |
| 5,077,072 | 12/1991 | Sieradzki | 426/523 |
| 5,119,719 | 6/1992 | DePasquale | 99/334 |
| 5,126,536 | 6/1992 | Devlin | 219/497 |
| 5,179,265 | 1/1993 | Sheridan et al. | 219/497 |
| 5,197,375 | 3/1993 | Rosenbrock et al. | 99/328 |
| 5,206,045 | 4/1993 | Stuck | 426/243 |
| 5,223,290 | 6/1993 | Alden | 426/243 |
| 5,231,920 | 8/1993 | Alden et al. | 99/443 C |
| 5,239,917 | 8/1993 | Lutkie et al. | 99/443 C |
| 5,253,564 | 10/1993 | Rosenbrock et al. | 99/328 |
| 5,277,105 | 1/1994 | Bruno et al. | 99/443 C |
| 5,277,924 | 1/1994 | Padilla | 426/523 |
| 5,398,666 | 3/1995 | Smith et al. | 126/21 A |
| 5,404,798 | 4/1995 | Omarini | 99/395 |
| 5,441,035 | 8/1995 | Liang-Chieh | 126/21 R |
| 5,454,295 | 10/1995 | Cox et al. | 99/332 |
| 5,458,051 | 10/1995 | Alden et al. | 99/349 |

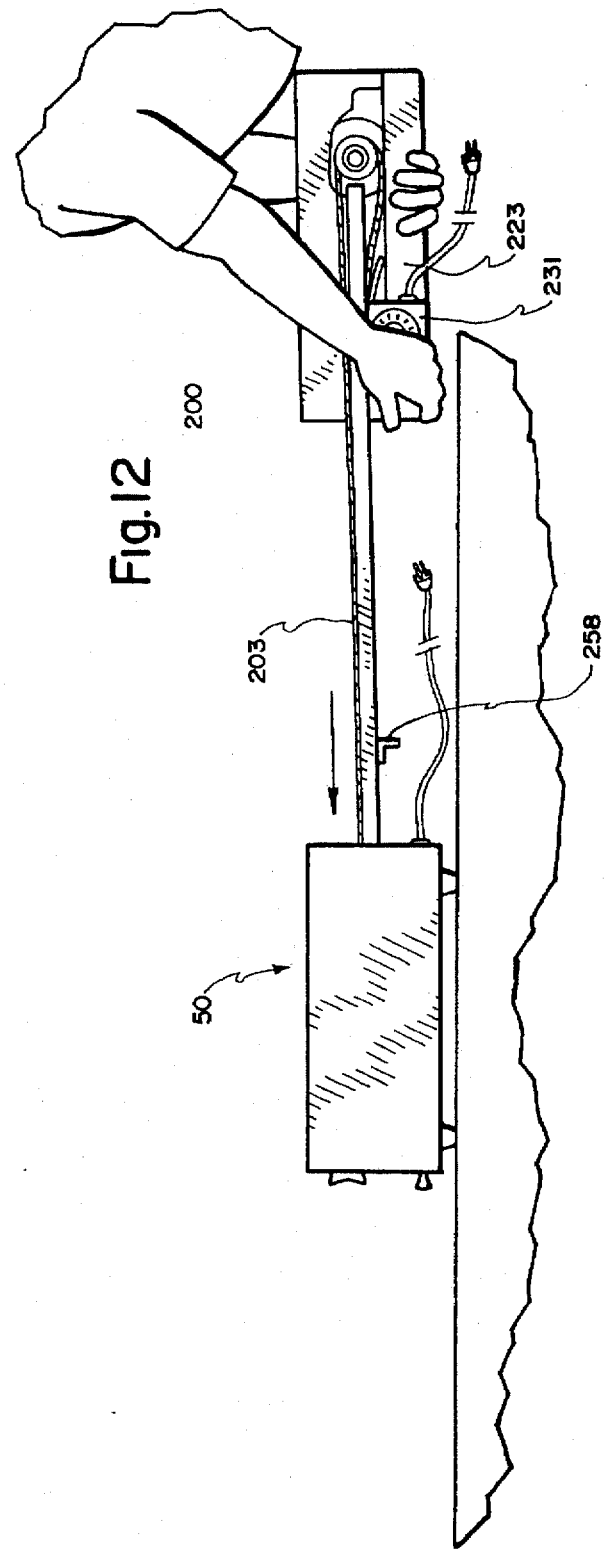
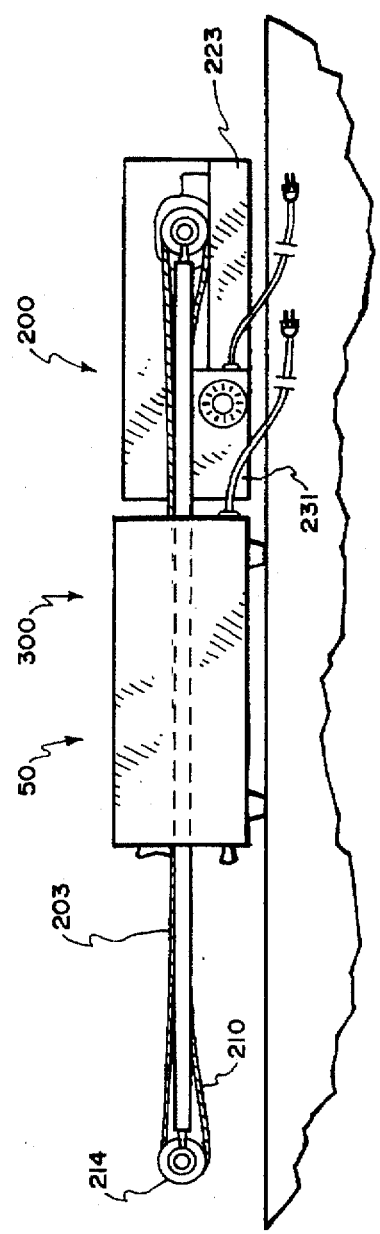
Fig. 12
Fig. 13

PIZZA OVEN WITH CONVEYOR

FIELD OF THE INVENTION

This invention relates to portable ovens for cooking small food items, such as pizza and the like.

BACKGROUND OF THE INVENTION

There are many ovens known in the art for cooking, browning, or heating foodstuffs. More specifically for the restaurant industry there are small ovens for the batch heating of various items, such as pizzas, toast, bagels, and the like. These ovens are designed for intermittent use and generally comprise a cooking chamber heated by electrical radiant heating elements. The heating elements are typically controlled by means of an on/off electrical switch with a timer and bimetallic or adjustable thermostat. The foodstuff is placed in the cooking chamber to be heated or cooked and the time set for the desired length of cooking.

These ovens are suitable for intermittent, occasional, and low-use applications, but where the use is higher, such as in small restaurants, these ovens are inconvenient in that they require several motions to insert the foodstuff, set the oven timer, and remove the foodstuff. They require constant attention to make sure the foodstuff does not burn in the oven. In addition, they require handling of hot foodstuffs into and out of the oven, which further decrease the efficiency of the user and also present a safety problem. As an alternative, there are specialized ovens that include a means for conveying foodstuff through a cooking chamber. The problems with these types of ovens are that they are mechanically complex, dedicated to a single use, difficult to clean, maintain and move, expensive, and typically large and bulky. For a small restaurant operation requiring something more than an ordinary toaster oven, these ovens are too expensive, too large, too complex, and often not adaptable to cooking different foodstuffs.

Accordingly, there is a need for an oven with a conveyor system that can be used for cooking various foodstuffs which is inexpensive, easy to clean, portable, and easy to maintain.

OBJECTS

It is, therefore, an object of the invention to provide an oven apparatus that can be used to cook various foodstuffs, such as pizzas, without the inconvenience of ordinary toaster ovens.

An object of importance of the invention is to provide an oven apparatus that includes a conveyor system for conveying foodstuffs through an oven.

It is further an object of the invention to provide an oven apparatus that is easy to maintain, inexpensive, and portable.

An object of significance is to provide a method for assembling and disassembling an oven apparatus that can be accomplished by a single person with no technical training.

Further objects of the invention will become evident in the description below.

SUMMARY OF THE INVENTION

The present invention involves a small, table top oven with a conveyor system to cook small foodstuffs. The oven has an ingress/egress opening at one location. The oven is modified with an opposing opening and equipped with a motor-driven conveyor for the slow displacement of foodstuffs, such as pizzas, sequentially through the oven to appropriately warm and cook the foodstuff. This conveyor equipped, table top oven can be fabricated so as to be relatively inexpensive. Included is a variable speed motor so that the length of time during which the pizza is exposed to oven temperatures can be varied as necessary. Accordingly, the oven apparatus of the invention is suitable for cooking or warming of any small foodstuff, such as pizza, pizza slices, bread to be toasted or warmed (e.g. pizza and garlic breads), sandwiches, brown and serve snack products, pastas, bagels, soft pretzels, and any other similar foodstuff. It is also contemplated that cassettes or trays to contain the foodstuffs as they are conveyed through the oven section can be used.

The conveyor system is not integral to the oven but is easily dismantled which permits easy removal of the oven. This allows the components of the oven and the conveyer to be easily cleaned and maintained. In addition, the oven may then be used as a conventional batch cooking oven after removal of the conveyor section. Thus, the conversion of the oven is reversible. Since none of the essential elements necessary for function of the oven section as a simple toaster oven have been modified, it may be returned to is originally intended use when and if desired. The conveyor oven of the invention is not mechanically complex, therefore, it is easy to maintain. The oven is easily disassembled for easy cleaning, moving, or storage of the oven.

The operation of the oven is simple, requiring only one or two control settings for a particular type of foodstuff, including the cooking time as determined by the speed of conveyance through the oven. After setting the control regulating the speed of the conveyor, the foodstuff is merely placed upon the upper flight of the conveyor. As the conveyor moves the foodstuff, the oven automatically cooks the foodstuff for the desired time. The foodstuff, once cooked and discharged from the oven, can be retrieved within a reasonable time. Thus, constant attention is not required from the user to ensure the foodstuff is timely removed from either the oven or the conveyor. Accordingly, the oven apparatus of the invention does not require an undue amount of attention or number of adjustments to operate correctly. In addition, once set, several similar food items can be cooked sequentially without any further adjustment of the oven. The conveyor system is left running and one or more additional foods are merely placed upon the conveyor in turn. In the present invention, it is not necessary to handle the foodstuffs in and out of the oven since the foodstuffs are merely placed upon and removed from ends of a conveyor, thus eliminating a safety hazard and simplifying the foodstuff handling by the user.

BRIEF DESCRIPTION OF THE DRAWINGS

FIG. 12 is a side view showing insertion of the conveyor section of FIG. 7 into the oven section of FIG. 1.

FIG. 13 is a side schematic view showing the assembled apparatus of the invention with the conveyor section inserted within the oven section.

DETAILED DESCRIPTION OF THE INVENTION

Oven Section

Figure 1:
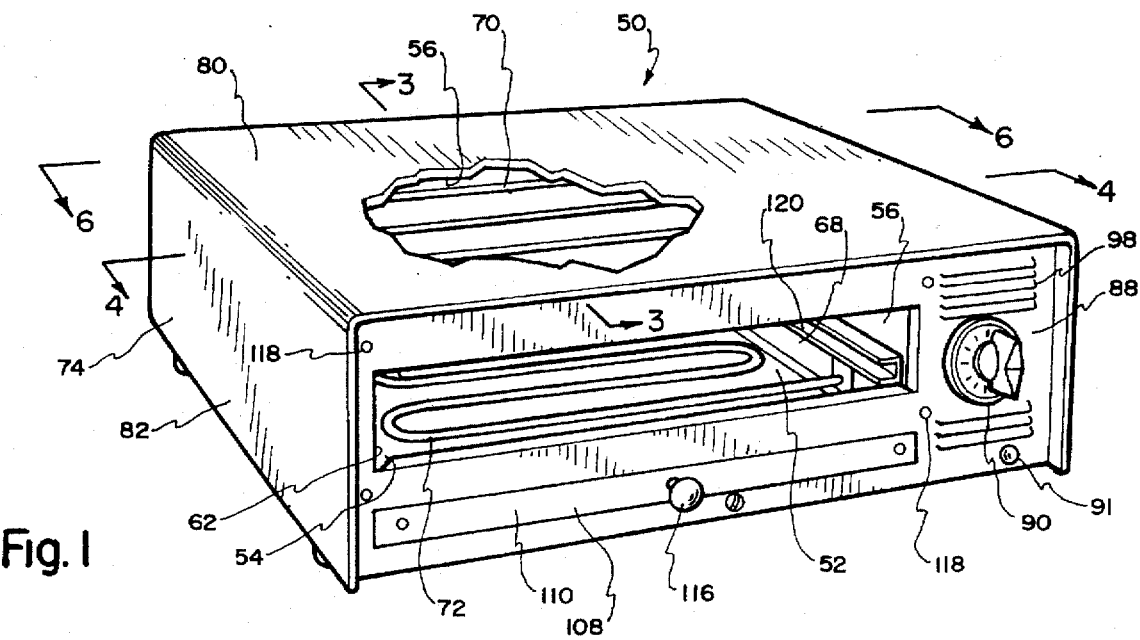
FIG. 1 is a perspective view of an oven section of the invention.

Referring to FIGS. 1 through 4 which illustrate a modified pizza oven for use as an oven section in an apparatus of the invention, the oven section 50 of the invention comprises a cooking chamber 52 defined by a bottom wall 54, a top wall 56, right and left side walls 58 and 60, respectively, a front wall 62, and a rear wall 66. In the front wall 62 is a front aperture 68 and in the rear wall 66 is a rear aperture 69 which is horizontally and vertically aligned with the front aperture 68. The rear aperture 69 has approximately the same horizontal dimensions and slightly larger vertical dimensions as the front aperture 68. The cooking chamber 52 is heated by an electrical heating means comprising an upper radiant heater 70 and a lower radiant heater 72 disposed within the cooking chamber 52.

Except for the modification to form the rear aperture 69, as hereinafter will be more fully explained, the oven section 50 of the apparatus of the invention is of conventional pizza oven construction. The illustrated oven in its unmodified form is available as Model 412-8P from Wisco™ Industries, Inc., Oregon, Wis. Any ovens from this Model series, such as 412-3, 412-SWP, etc., are also suitable. Similar ovens are available from other manufactures, for example Model/N300, available under the name of Nova Pizza Oven™ from Nova Industries, Inc., Oak Creek, Wis.

Figure 4:
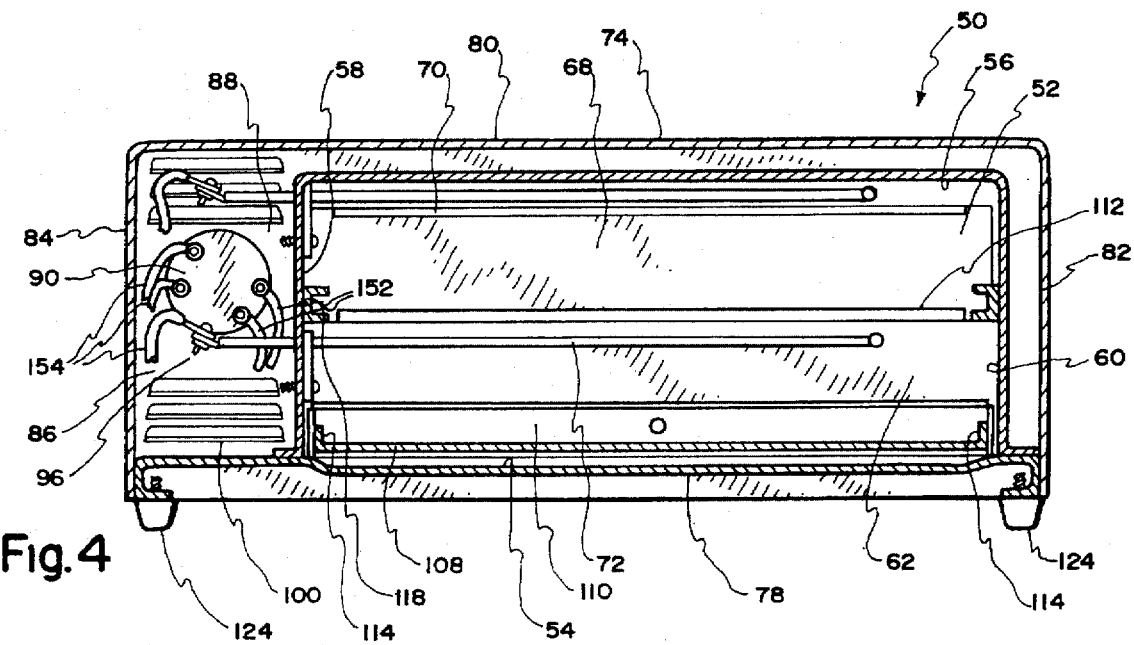
FIG. 4 is a cross-section of the oven section of FIGS. 1 through 4—4.

The oven section is preferably made of stainless steel or like material and is conventional, double-wall construction typically used in pizza ovens. Referring to FIG. 4, the top wall 56, bottom wall 54, and side walls 58, 60 are enclosed in an outer shell 74. The shell comprises a bottom panel 78 from which the side walls 58, 60 of the cooking chamber 52 extend upwards. A top panel 80 and side panels 82, 84 of the outer shell 74 are formed from one piece of sheet metal that is bent in a generally inverted U-form to provide the central top panel 80 with downwardly extending left and right side panels 82, 84. The lower ends of the side panels are attached to the bottom panel 78 at its edges to enclose the cooking chamber 52.

The front panel 86 of the oven section 50 is a single-wall construction and extends downward from the front of the top panel 80 to the bottom panel 78 and extends between the side panels 82, 84. A portion of the front panel 86 functions as the front wall 62 of the cooking chamber, and another portion functions as a control panel portion 88 for mounting an electrical control switch 90 and control switch light 91 for the upper and lower radiant heaters 70, 72.

A rear panel 92 of the outer shell extends downward from the rear of the top panel 80 to the bottom panel 78 and extends between the side panels 82, 84. The rear panel 92 has a rear wall portion that is the same as the rear wall 66 of the cooking chamber 52, and an extended portion 94. The control panel portion 88, the cooking chamber right side wall 60, the extended portion 94, the right side panel 84, and portions of the top panel 80 and the bottom panel 78 define a control enclosure 96, which encloses the rear of the electrical control switch 90, and switch control light 91 separating it from the cooking chamber 52. The control enclosure also contains the appropriate leads and connections to the radiant heaters 70, 72. The upper and lower radiant heaters 70 and 72 are mounted in the cooking chamber 52 by upper and lower heater mounts 126 and 128, which also include apertures in the right side wall for passage of electrical conductors into the control enclosure 96. The control panel portion 88, and the extended portion 94 have louvers 98 and apertures 100, respectively, for ventilation of the control enclosure 96.

An overlay sheet 101 covers the rear panel 92 on the outside surface corresponding to the rear wall 66. The extended portion 94 also includes a hole 102 with a grommet 104 through which the electrical supply line 106 for the radiant heaters 70, 72 is passed.

The oven section 50 also comprises a crumb collector tray 108 with front, rear, and side lips 110, 112, 114 and a pull knob 116. The crumb tray 108 slidably rests on the bottom panel and extends under the cooking chamber such that crumbs falling therefrom are collected. The crumb tray is cleaned by removing the crumb tray by means of pull knob 116.

Figure 5:
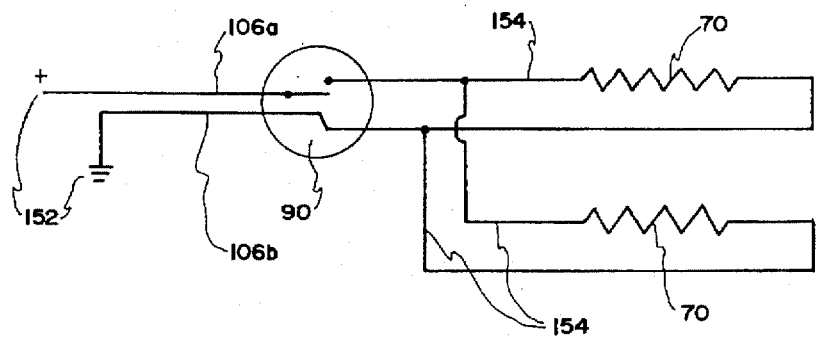
FIG. 5 is an electrical circuit diagram for the heating coils of the oven section of FIG. 1.
Figure 10:
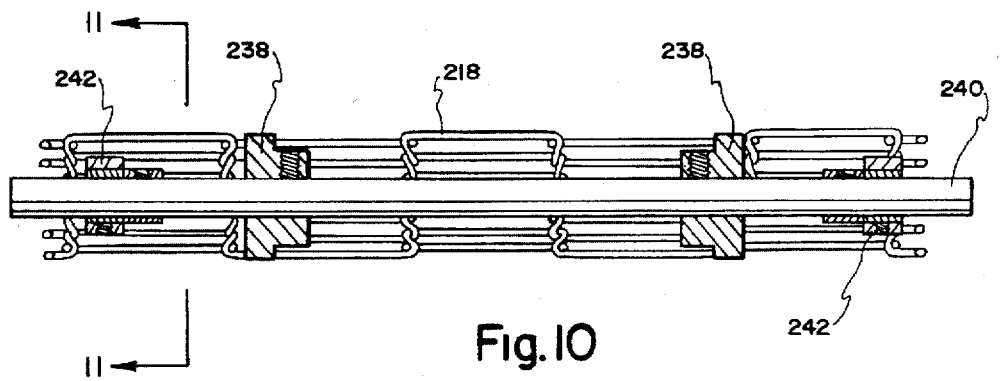
FIG. 10 is a cross-section of the conveyor section of FIGS. 7 through 10—10.
Figure 11:
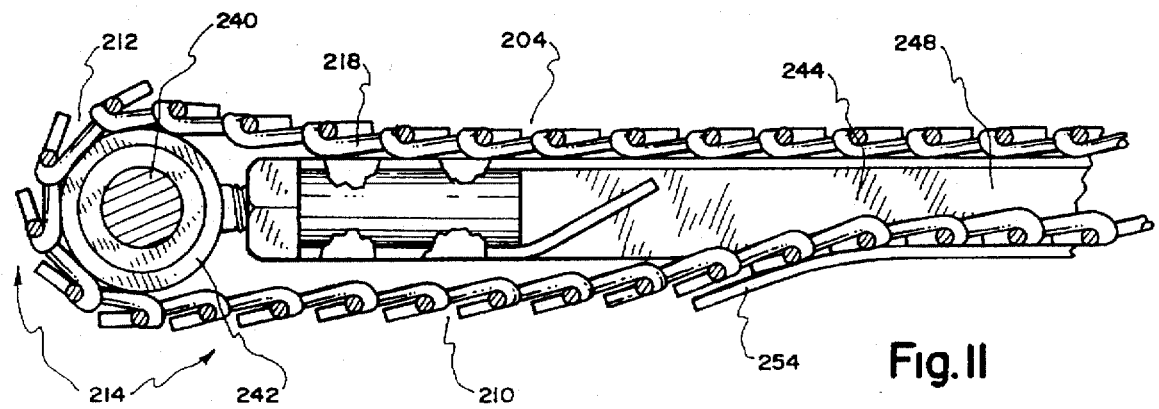
FIG. 11 is a cross-section of the rear end of the conveyor section of FIGS. 7 through line 11—11 in FIG. 10.

FIG. 5 is a schematic diagram of the electrical supply circuit 150 for the electrical radiant heaters 70, 72. Leads 106a and 106b of the electrical supply line are directed from an electrical power source 152, represented by the plus (+) and ground symbols, to the control switch 90. The control switch is a basic on/off switch controlling current flow to the radiant heaters 70, 72, connected in parallel through lines 154. The radiant heaters 70, 72 may be any suitable heaters, such as resistance nichrome bar heaters as illustrated in the drawings. Other electrical resistance radiant heaters are also suitable, such as nichrome coils, ceramic heaters, and the like. It is also contemplated to use other non-electrical radiant heaters, such as heaters using a hydrocarbon gas fuel (propane, methane, natural gas, LPG, etc.) or a hydrocarbon liquid fuel (kerosene, gasoline, or Coleman™-type stove fuels).

Figure 6:
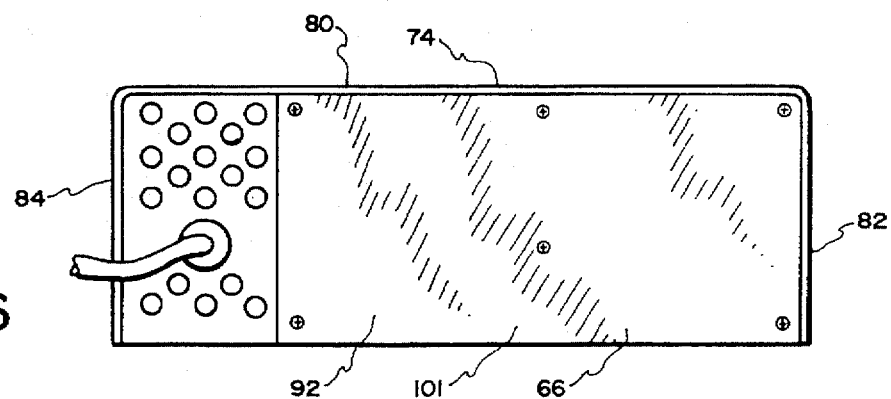
FIG. 6 is the rear view of an oven as in FIGS. 1 to 5, with a back plate applied to restore it to its original function.
Figure 2:
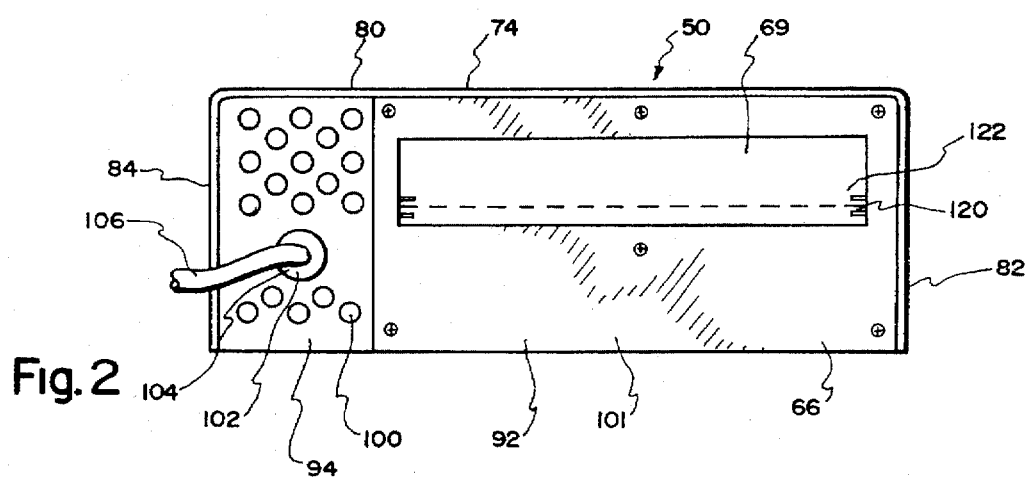
FIG. 2 is a rear view of the oven in FIG. 1.
Figure 3:
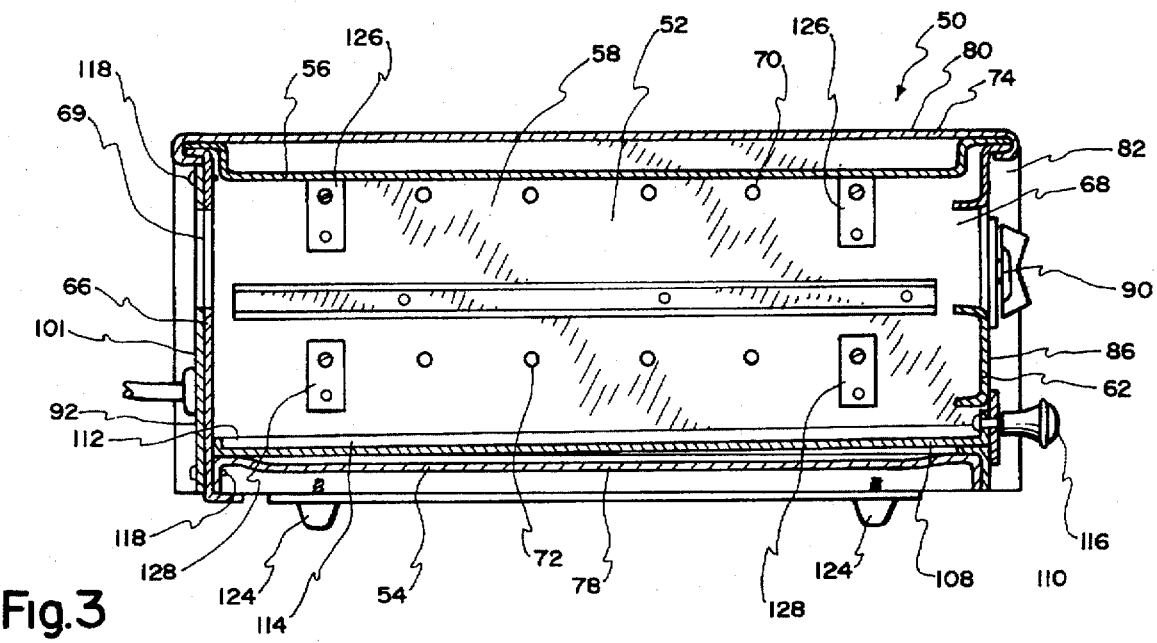
FIG. 3 is a cross-sectional view of the oven section of FIGS. 1 through 3—3.

FIG. 6 shows the rear of an unmodified conventional pizza oven. The reference numbers refer to equivalent parts as in FIG. 2. The rear wall 66 of the rear panel 92, i.e., the portion that forms a wall of the cooking chamber, is solid and contains no holes or apertures. To modify the pizza oven in order to function as an oven section of the invention, the rear aperture 69 shown in FIG. 2 is cut through the rear wall 66. The rear aperture 69 is cut with dimensions essentially the same as the front aperture 68 and is vertically and horizontally aligned with the front aperture. The aperture is preferably cut by a means that does not materially distort the sheet metal around the aperture and does not require disassembly of the oven. As an example, the aperture may be cut using a high-speed circular cutting wheel, a plasma cutter, or a laser.

The panels and walls of the oven section are preferably sheet metal, preferably of a rust- and heat-resistant material, such as stainless steel or galvanized or coated metals. The panels and walls may be assembled by conventional means such as welding or fasteners, e.g., metal screws, or rivets 118 as shown in the Figures.

Within the cooking chamber of the oven section are C-shaped side channels 120 attached in the cooking chamber 52 to the left and right side walls 58, 60. These were a part of the unmodified pizza oven to slidably support a stationary cooking surface or grate 122 (shown in FIG. 2 as a dotted line). For use as the oven section of the present invention, this cooking surface is removed and these channels become redundant. However, as more fully described below, the channels remain within the cooking chamber so that the oven section of the invention may be easily convened for use as a conventional pizza oven by removing the conveyor section and reinserting the cooking surface grate 122 in channel 120.

Conveyor Section

Referring to FIGS. 7 through 11, which illustrate a conveyor section 200 of the invention, the conveyor section 200 comprises a continuous, heat-resistant, flexible belt 202 that is formed into an elongated, continuous loop 203. The continuous loop 203 has an essentially horizontal upper flight 204, a rear reverse curve 206 at a rear end 208, a lower flight 210, and a front reverse curve 212 at a front end 214. A drive means 216 is also provided for advancing the belt 202 along the continuous loop 203. The flexible belt 202 comprises interlocking wires 218 looped as is conventional.

At the rear reverse curve 206 the flexible belt 202 passes around rear sprocket wheels 220 which define the rear reverse curve 206. Each of the rear sprocket wheels 220 is constructed with cogs 222 that engage the interlocking wires 218 of the belt such that turning the rear sprockets 220 advances the flexible belt 202 along the continuous loop 203. The rear sprockets 220 are mounted on a drive shaft 222 which is driven by an electric motor 224 through an appropriate speed reduction box 226. The speed reduction box 226 may be of conventional design. For example, referring to FIGS. 8 and 9, the electric motor 224 with an integrated gear box 226 has a power output through motor shaft 228 with a motor pulley 230, which is operably connected by a drive belt 232 to a drive pulley 234 on the drive shaft 222. The appropriate speed of the flexible belt 202, can be appropriate choosing the rotational speed of the motor/gear box 224/226, the size of the pulleys 230, 234, and the diameter of the rear sprocket wheels 220. The advancement speed of the belt 202 may be controlled by any appropriate means, such as a speed controller 236 for the electric motor 224. Preferably, the speed of advancement of the belt is such to provide a dwell or cooking time in the oven section of between 3 and 10 minutes. The motor may be of conventional design for use with household current sources (110 to 120 V, or 220 to 240 V AC, or 12 to 24 V DC) or with battery or portable power sources. A fan may also be included to appropriately cool the motor or other parts in a conventional way. While not shown, a means for varying the oven temperature, such as a variable voltage regulator in series with the electrical heaters, or a control valve for gas heaters, may also be provided. This would provide additional flexibility in providing the proper cooking environment and time for the foodstuff.

The front reverse curve 212 is defined by a set of front sprockets 238 that engage the interlocking wires 218 of the flexible belt 202. The front sprockets 238 function as idler sprockets and are not driven as are the rear sprockets 220.

The front sprockets 238 are mounted on a front axle 240. The front axle 240 and the drive shaft 222 are mounted generally parallel to one another, in bearings 242, which are fixed to right and left support rails 244, 246. The bearings or bushings 242 are of any suitable construction. Preferred bearings are a low maintenance type such as needle bearings or bronze sleeve bushings.

Figure 7:
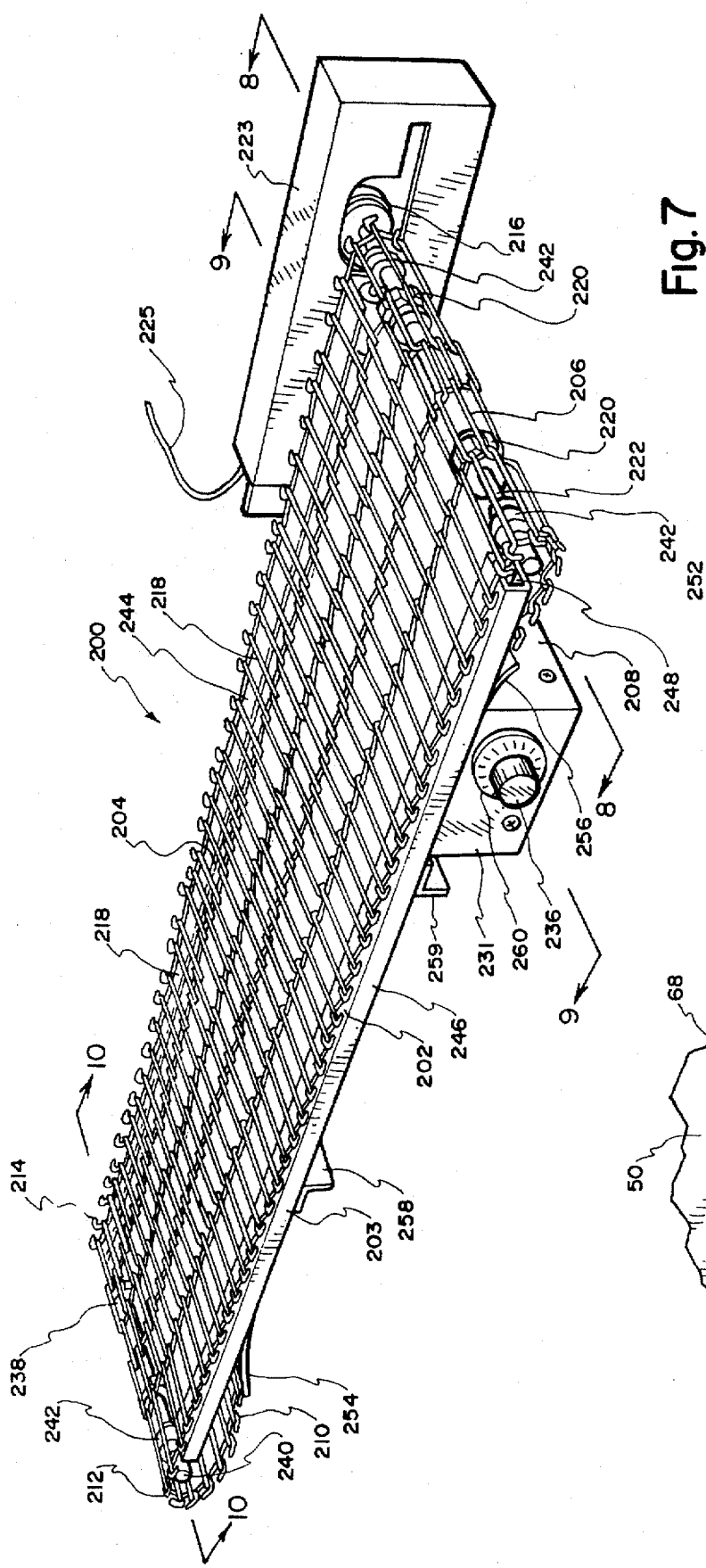
FIG. 7 is a perspective view of the conveyor section of an apparatus of the invention and is adaptable for use in conjunction with the oven section of FIG. 1.
Figure 9:
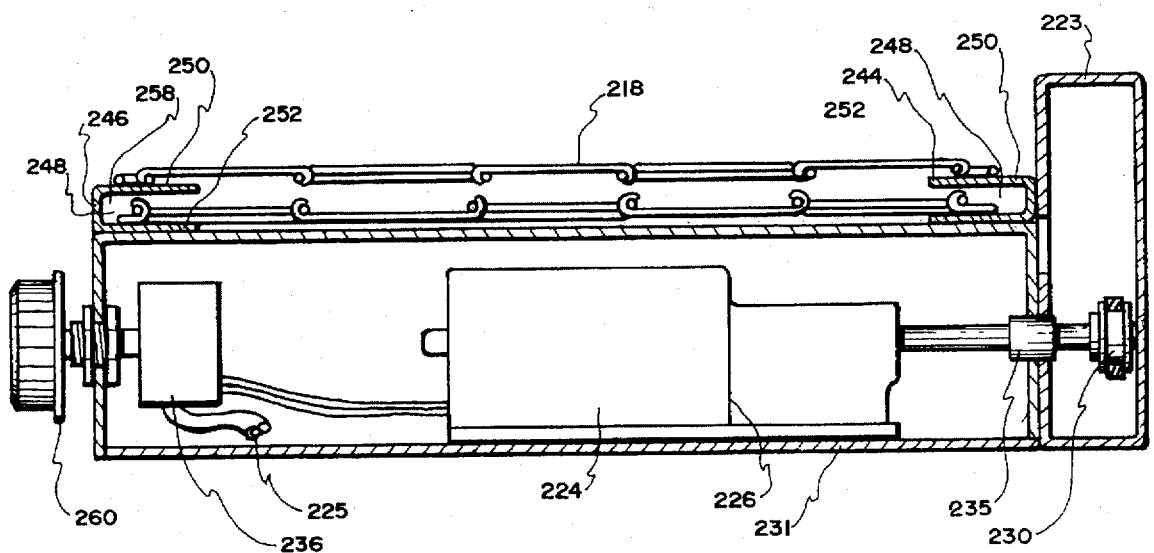
FIG. 9 is a section of the conveyor section of FIGS. 7 through 9—9 showing a speed controller drive means.

In addition to supporting the bearings 242, the support rails also function together with the drive shaft 222 and the front axle 240 as a frame to support the flexible belt 202 and maintain it in the elongated continuous loop 203. As shown in FIGS. 7 and 9, the support rails 244, 246 support a motor housing 231 to contain and support the motor 224 and speed controller 236. The right support rail 244 supports a pulley housing 223 to shield the motor and drive pulleys 230, 234 and drive belt 232. The support rails 244, 246 also function as guide rails for the lower flight 210 of the flexible belt 202. As illustrated in FIG. 9, this is accomplished by bending the support rails 244, 246 into a C-shaped channel 248 to form upper and lower guides 250, 252 with the lower flight of the belt traveling between upper and lower guides 250, 252. As illustrated, particularly in FIG. 11, at the front end 214 the lower flight 210 of the flexible belt 202 when in motion emerges from around the front sprockets. 238 and travels up a front transition ramp 254 to allow the lower flight 210 to easily enter the channel 248 after it has passed around the front reverse curve 212. A similar construction is provided at the rear end 208 as the lower flight 210 of the flexible belt 202 approaches the rear end 208, as seen in FIG. 7. A rear transition ramp 256 is provided to allow the lower flight 210 to emerge from the channel 248, engage the rear sprockets 220, and pass into the rear reverse curve 206. The channels 248 guide the lower flight, prevent the lower flight from sagging below the conveyor section 200, and allow the conveyor section to be inserted and supported in the oven section 50 without interference from the belt.

The conveyor section is constructed of appropriate material for its use. Preferably the major components are of stainless steel, such as SS-304 or SS-316 materials.

Assembly and Disassembly

The apparatus of the invention is easily assembled by uniting the oven section 50 and the conveyor section 200. See FIG. 12. This is accomplished by grasping the conveyor section and inserting the front end 214 of the conveyor section seriatim in and through the rear and front oven apertures 68, 69 from rear to front so that it extends from the front aperture 68. The conveyor section 200 is easily held by one person near its rear end 208, for example, by holding drive and motor housings 223, 231, as illustrated. The support rails 244, 246 have an angle bar stops 258, 259 attached to the underside which, when the belt is inserted, abuts the outer surfaces of the front and rear panels 86, 101 thus providing an indication that the conveyor section 200 has been inserted the proper distance and is disposed correctly within the oven section 50. A suitable single stop 258 is in the form of an L-beam attached transversely across the underside of the conveyor and connected to the left and right support rails 244, 246, as illustrated particularly in FIGS. 7 and 12 may also be used. As explained above, the lower flight 210 of the continuous loop 203 is supported in the C-cross-section 248 of the support rails 244, 246. This prevents the lower flight from sagging below the support rails and interfering with insertion of the conveyor section.

Figure 14:
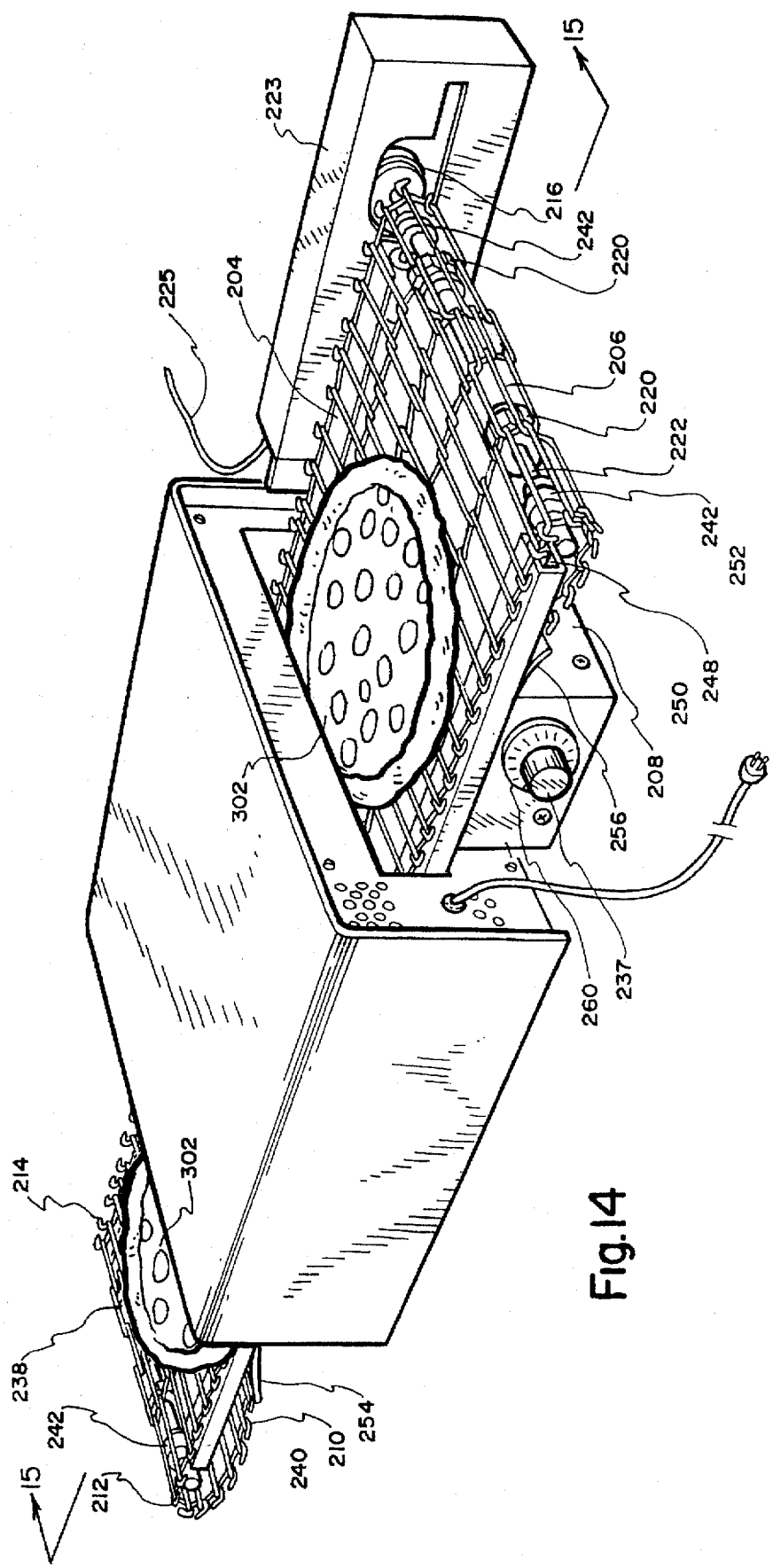
FIG. 14 is a perspective view of the assembled apparatus of the invention of FIG. 13.
Figure 15:
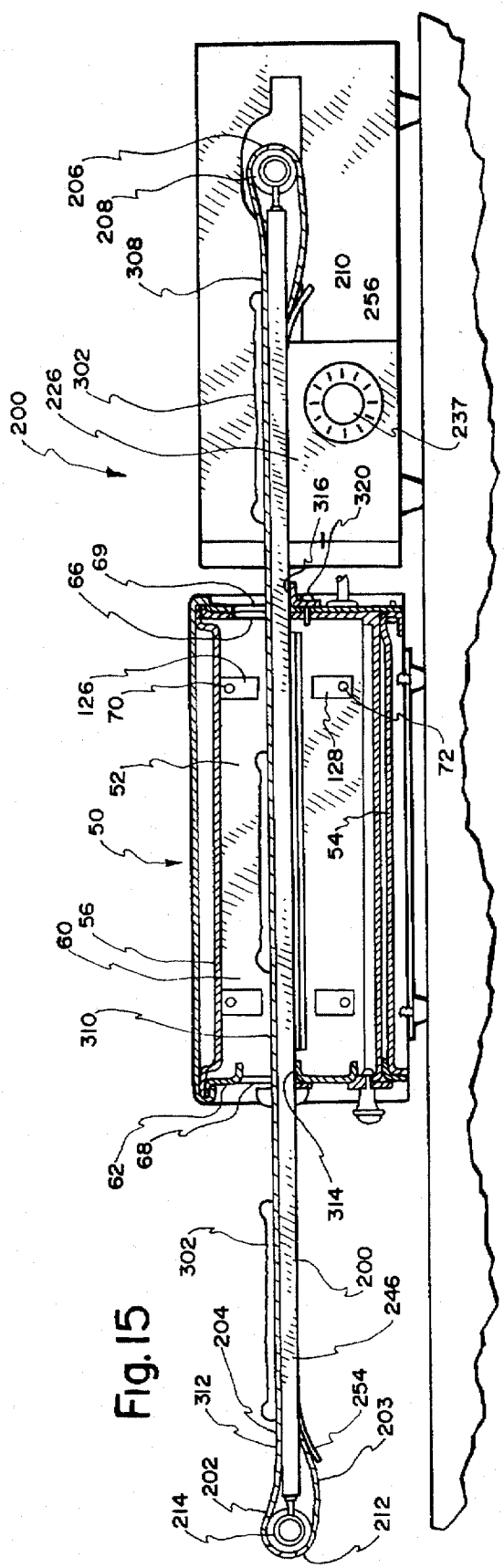
FIG. 15 is a cross-sectional view of the assembled apparatus of the invention of FIGS. 14 through 15—15.

Referring to FIGS. 13 through 15, when in place, the front and rear ends 214, 208 extend in cantilever fashion from the front and rear apertures 68, 69, respectively. The rear end 208 with the attached drive means 216 extends from the rear aperture 69 such that a rear surface portion 308 of the upper flight 204 is exposed for placing foodstuffs 302 upon the upper flight 204 of the continuous loop 203 to initiate cooking of the foodstuff. The flexible belt 202 is set in motion by the drive means either after or before placing the foodstuff 302 on the upper flight 204. Thus, the foodstuff is conveyed to a middle portion 310 of the upper flight 204, within the cooking chamber 52 of the oven section 50. The speed of advancement of the flexible belt is such to maintain the foodstuff in the cooking chamber for the proper preselected cooking time. The speed controller 236 may include a dial 237 with indicia 260 which shows cooking time in the oven section or belt speed settings.

Referring particularly to FIG. 15, the continuous loop passes between the upper and lower radiant heaters 70, 72. The foodstuff 302 passes through and is cooked within the cooking chamber 52 between the radiant heaters 70, 72. Illustrated is an apparatus with upper and lower radiant heaters 70, 72, but other appropriate configurations are contemplated, for example, having only upper radiant heaters. The control circuit for the heaters may also be modified to selectively turn on multiple upper heaters or multiple upper and lower heaters together.

Referring to FIGS. 13 through 15, the foodstuff 302, through further advancement of the flexible belt 202, is conveyed to a front portion 312 of the upper flight 204 where the foodstuff can be easily removed while it is being conveyed. The front portion 312 is sufficiently long, and the conveyance speed of the belt is sufficiently low, to allow a moderate time interval (usually between 3 and 5 minutes) for a user to safely and timely remove the foodstuff without the requirement of constant attention and observation. The drive means 216 for the belt may alternately be turned off to allow the foodstuff to remain and cool on the front portion. Alternatively, an appropriate means for receiving the foodstuff may also be provided for receiving the foodstuff as it advances to the front end of the continuous loop and exits the top flight 204.

The right and left support rails 244, 246 are supported upon the bottom edges of the front and rear apertures 314, 316, respectively. No further support of the conveyor section is required. The conveyor section is preferably held to the oven section by the weight of the conveyor section. Thus, the conveyor system is attached, but removable by simply reversing the steps of assembly, by grasping the conveyor section, lifting and pulling the elongated loop out through the front and rear oven 68, 69 apertures. The lower flight 210 of the continuous loop 203 is supported between the upper and lower guides 250, 252 of the support rails 244, 246, as explained above, so that the aperture bottom edges 314, 316, to lower radiant heater 72, or other structure of the oven will not interfere with the travel of the lower flight.

An advantage of the invention is that the conveyor section 200 is not permanently attached to the oven section 50, and each individual section is easily handled. The cooking apparatus of the invention can be easily disassembled by one person into separate manageable sections, i.e. the oven and conveyor sections. The sections can be moved or stored as desired. The stored sections can be reassembled again when desired on any site without any special tools or technical training. For cleaning or maintenance, the separate oven and conveyor sections are readily accessible. In the oven section, the cleaning is the same as with an ordinary toaster-type oven. The disassembled conveyor section is easily cleaned without any concern over damaging the heating coils of the oven. The conveyor section can be immersed up to the electrical motor and soaked, which is not possible with conventional conveyor ovens. Because the oven can be easily cleaned in a complete and thorough manner, the cleaning can be frequent, which results in better sanitation and less build-up of debris when compared to prior-art oven and conveyor assemblies. In addition, the oven section, with the conveyor section removed, can be used as a conventional toaster oven. This is preceded by reinserting the original cooking platform and reattaching a back plate.

Figure 16:
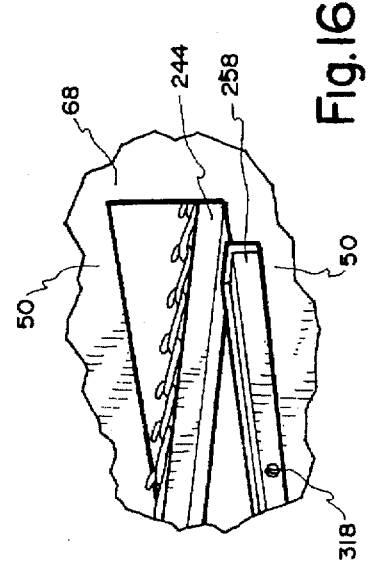
FIG. 16 is a detailed view of an attachment of the oven section with the conveyor section.
Figure 8:
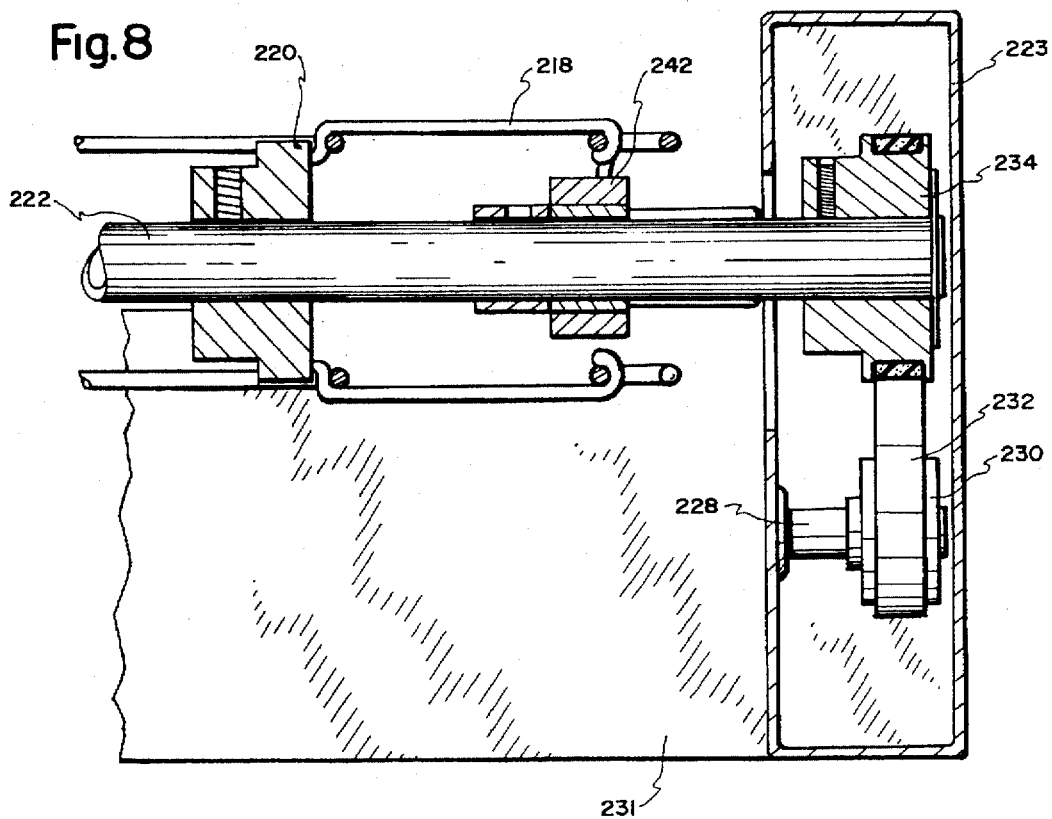
FIG. 8 is a cross-section through 8—8 of the conveyor section of FIG. 7 showing the gear train of the drive section.

If it is desired to secure the conveyor section 200 in the oven section 50 against inadvertent misplacement caused by vibration, bumping, or the like, one or more fasteners 318 may be used. Each fastener is illustrated as comprising a screw passing through the L-beam bracket 258 mounted upon the support rails 244, 246 of the conveyor section 200 and also through the from panel 86 of the oven section 50. See FIG. 16. Alternatively, a screw or fastener 320 may be passed through the rear panels 101, 66 and into to a second support L-beam 259 on the control box. Any other releasible attachment means that function similarly are also contemplated by the invention.

Figure 17:
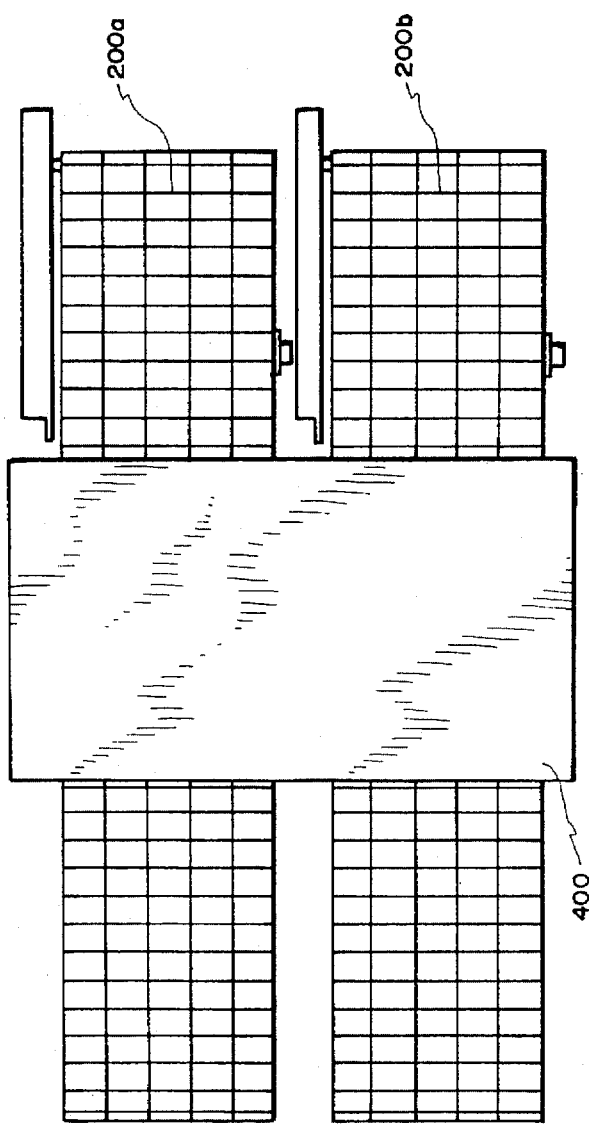
FIG. 17 is a perspective schematic view of another embodiment of the invention showing two conveyor sections assembled into the oven section.

The oven apparatus of the invention may be scaled to accommodate a wider conveyor section or multiple conveyor sections. Referring to FIG. 17, an oven apparatus of the invention is shown with two conveyor sections 200a, 200b. The oven section 400 and each of the conveyor sections are essentially as previously described except the oven section is wider with wider front and rear apertures to accommodate the two conveyor sections. The wider apertures can also be used to accommodate a wider belt. While not shown, the oven section and the double conveyor sections may be modified to more conveniently position the controls, such as changing the position of the speed controls. These controls may be placed at a desired distance from the oven ingress and egress openings and may comprise one control box. The oven apparatus is assembled by inserting each conveyor section individually, essentially as previously described. The oven is disassembled by reversing the operation by individually removing each conveyor section. The oven apparatus of the invention may be similarly modified to accommodate more than two conveyor sections by enlarging the oven section. A commercially available toaster oven having substantial width, which may be modified to accommodate a wider single conveyor or two conveyors is a Wisco™ Model 560.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed and desired to be secured by Letters Patent is:

1. A conveyor oven for cooking foodstuff comprising:
   a fully enabled and independently functional oven system comprising a cooking chamber and enabled segregated oven controls;
   a conveyor fully enabled and independently functional and enabled conveyor controls segregated from and independent of the oven controls, the conveyor inserted as a self contained unit into and extending removably through the cooking chamber.

2. A conveyor oven according to claim 1 wherein the conveyor comprises a low profile endless chain loop, link-type belt comprising an upper flight and a lower flight, a frame, and a chain loop link-type belt drive assembly.

3. A conveyor oven according to claim 2 wherein the conveyor frame comprises opposed beams.

4. A conveyor oven according to claim 3 wherein each beam comprises a cross section which is generally C-shaped.

5. In combination, a separate self-contained oven for foodstuff and a separate self-contained conveyor for displacing food through the oven;

the conveyor comprising an endless carrier, a carrier drive motor, and controls exclusively for the conveyor which are independent and not integrated with the oven allowing unitary combining and decombining of the conveyor and the oven as separately operable and fully enabled units;

the oven comprising at least one source of heat, a cooking chamber into which the conveyor extends, and controls exclusively for the oven which are independent and not integrated with the conveyor allowing unitary insertion and removal of the conveyor into and from the cooking chamber as an operable full enabled unit.

6. An apparatus for cooking foodstuff by conveying the foodstuff through a cooking chamber comprising:

an autonomous oven comprising a bottom wall and top wall, two side walls, a front wall, and a rear wall defining a cooking chamber, the front wall having a front aperture and the rear wall having a rear aperture horizontally aligned with the front aperture, at least one heater disposed within the cooking chamber to heat a foodstuff in the cooking chamber;

at least one autonomous conveyor fully operable independent of the oven and removably associated with the oven and comprising a continuous heat-resistant yieldable continuous belt-like carrier comprising a low profile configuration comprising an essentially horizontal upper flight, a front reverse curve at a front end, a lower flight and a rear reverse curve at a rear end, a drive mechanism for advancing the carrier around to convey foodstuff along the top flight, the conveyor being sized and shaped such that the elongated continuous loop can be inserted lengthwise into the oven section through the aligned front and rear apertures of the oven section as a unitary autonomous mechanism with the top and bottom flights extending through the cooking chamber and the front and rear ends extending in cantilevered fashion out from the front and rear wall apertures, respectively, the conveyor being removably carried within the oven such that the oven system and the conveyor system remain autonomous and functionally independent when separated.

7. An apparatus for cooking foodstuff as in claim 6 wherein the conveyor is removably carried by the oven solely by gravity.

8. An apparatus for cooking foodstuff as in claim 7 wherein the conveyor is removably carried by the oven by use of at least one fastener.

9. An apparatus according to claim 6 wherein the drive mechanism comprises a drive motor, a drive sprocket, and a drive chain.

10. An apparatus according to claim 9 wherein the drive mechanism comprises a variable speed control by which the speed of the carrier can be varied.

11. An apparatus according to claim 6 wherein the oven comprises a housing comprising top, bottom, side, front, and rear walls, two of the walls containing opposed apertures, each comprising a thin vertical profile through which the conveyor is inserted and removed.

12. An apparatus according to claim 6 wherein the conveyor comprises at least one frame member connected to the oven only by one or more fasteners.

13. An apparatus according to claim 12 wherein the at least one frame member comprises opposed support rails.

14. An apparatus according to claim 13 wherein each rail is C-shaped in cross section which enclose the sides of the carrier.

15. An apparatus for cooking foodstuff comprising:

a unitary oven comprising a housing, a cooking chamber within the housing, at least one heater oven control for the heater, and two opposing apertures in the housing;

a unitary conveyor removably associated with the oven, comprising a powered endless two flight rotatable carrier, a carrier drive, a prime mover for displacing the carrier drive, and a carrier control the conveyor physically being associated with but separately operable from the oven, the conveyor such that a foodstuff can be placed upon the upper flight of the carrier and conveyed into and through the oven solely by use of the carrier control then out of the oven section.

16. The apparatus according to claim 15 wherein non-control structure associates the oven and the conveyor such that the conveyor remains fully enabled as does the oven when the conveyor is withdrawn from the oven.

17. A method comprising the steps of:

providing a fully and independently operated and independently controlled oven for cooking foodstuff;

providing a fully and an independently controlled conveyor for passing foodstuff to be cooked through the oven;

physically combining the oven and conveyor without making either inoperable;

causing the physically combined oven and the conveyor to separately operate concurrently to displace foodstuff along the conveyor and to cook the foodstuff while the foodstuff is displaced in the oven.

18. A method according to claim 17 further comprising the steps of:

separately discontinuing the operations of the oven and the conveyor;

physically separating the oven and the conveyor without making either inoperable.

19. A method according to claim 18 further comprising the step of operating the oven and/or the conveyor one independent of the other after said physically separating step.

20. A method of making and using a conveyor oven from an autonomous, never disabled or disassembled conveyor and an autonomous, never disabled or disassembled oven, comprising the steps of:

inserting the autonomous conveyor in a fully enabled condition through opposed apertures in the oven which is in a fully enabled condition;

separately actuating the oven and conveyor so that each operates autonomously;

placing foodstuff on the conveyor and displacing the foodstuff through the oven on the conveyor at a predetermined rate of displacement;

cooking the foodstuff in the oven.

21. A method according to claim 20 further comprising the step of removing the autonomous conveyor in its fully enabled condition from the oven through the opposed apertures while the oven remains in its fully enabled condition.

22. A method of making and using a conveyor oven comprising the steps of:

providing an autonomous independently enabled conveyor;

providing an autonomous independently enabled oven comprising an existing ingress and egress aperture;

forming a second aperture in the oven at a location opposite the existing aperture;

physically combining the oven and the conveyor without disabling either so that the conveyor extends through both apertures;

separately actuating the oven and the conveyor;

placing foodstuff on the conveyor for displacement through the oven;

cooking the foodstuff as it is displaced on the conveyor through the oven.

23. A method according to claim 22 wherein the oven is a light weight small table top oven.

24. A method according to claim 22 further comprising physically decombining the oven and the conveyor without disabling either.

25. A method for modifying a conventional toaster oven that comprises:

a cooking chamber defined by top wall, two side walls, a front wall having an aperture for insertion of foodstuff into the cooking chamber, and rear wall, a heater disposed within the cooking chamber to heat a foodstuff in the cooking chamber, a removable platform for supporting the foodstuff, the method for modifying the oven comprising;

removing the removable platform from the cooking chamber;

physically cutting an aperture in the rear wall that is substantially aligned with the aperture in the front wall without disabling any of the elements of the oven that allow it to fully function as an oven or removing support structure for the removable platform;

inserting an integral elongated endless conveyor system, comprising an endless conveyor and a drive, through the rear and front apertures such that both an upper and lower flight of the conveyor belt extends from the rear aperture, through the cooking chamber, and from the front aperture.

26. A method as in claim 25 additionally comprising removing the elongated belt conveyor system out through the apertures as a single fully functional unit without requiring further disassembly of the oven or the belt conveyor system.

27. A conveyor cooking oven comprising an oven with a cooking chamber and at least one integral belt conveyor and drive unit, the integral belt conveyor and drive unit disposed in relation to the oven to convey foodstuff through the cooking chamber with a belt conveyor extending through the cooking chamber and extending from the cooking oven through apertures on the front and rear of the cooking chamber in a cantilever fashion, the integral belt conveyor and drive unit removable from the oven as a fully functional unit by withdrawing the belt conveyor through the apertures as a single unit without further disassembly of the oven or the integral belt conveyor and drive.

28. An apparatus comprising:

a cooking oven comprising a cooking chamber with at least one radiant heater disposed therein and opposing apertures in walls of the cooking chamber;

an elongated conveyor placed through the apertures, the conveyor being operable independent of the oven and comprising an endless link carrier comprising upper and lower flight and drive train structure for turning the carrier, the conveyor comprising ends extending from the apertures such that the conveyor advances foodstuff from outside of the cooking chamber, into and through the cooking chamber, and out of the cooking chamber.

* * * * *